United States Patent
Kung et al.

(10) Patent No.: US 7,284,363 B2
(45) Date of Patent: Oct. 23, 2007

(54) METHOD OF POWER GENERATION FOR AIRBORNE VEHICLES

(75) Inventors: Ru-Li Kung, Walnut, CA (US); Mike S. Koemer, Rancho Palos Verdes, CA (US); Tom Iles, Rancho Palos Verdes, CA (US)

(73) Assignee: Honeywell International, Inc., Morristown, NJ (US)

( * ) Notice: Subject to any disclaimer, the term of this patent is extended or adjusted under 35 U.S.C. 154(b) by 386 days.

(21) Appl. No.: 10/870,568

(22) Filed: Jun. 16, 2004

(65) Prior Publication Data

US 2005/0279098 A1 Dec. 22, 2005

(51) Int. Cl.
*F02C 6/00* (2006.01)

(52) U.S. Cl. ............... 60/39.182; 60/655; 60/670

(58) Field of Classification Search ........... 60/39.02, 60/39.182, 655, 670
See application file for complete search history.

(56) References Cited

U.S. PATENT DOCUMENTS

| | | | |
|---|---|---|---|
| 4,067,189 A | 1/1978 | Earnest | |
| 4,238,925 A * | 12/1980 | Lowther | 60/39.461 |
| 4,347,711 A * | 9/1982 | Noe et al. | 62/160 |
| 4,479,355 A * | 10/1984 | Guide et al. | 60/683 |
| 4,594,850 A * | 6/1986 | Joy | 60/791 |
| 4,759,178 A | 7/1988 | Joy | |
| 5,012,646 A | 5/1991 | Speer | |
| 5,309,029 A | 5/1994 | Gregory et al. | |
| 5,934,065 A * | 8/1999 | Bronicki et al. | 60/39.181 |
| 6,247,315 B1 * | 6/2001 | Marin et al. | 60/672 |
| 6,276,123 B1 | 8/2001 | Chen et al. | |
| 6,517,548 B2 * | 2/2003 | Lorentzen Cornelius et al. | 606/108 |
| 6,606,865 B2 | 8/2003 | MacKay | |
| 6,629,413 B1 * | 10/2003 | Wendt et al. | 60/655 |
| 6,725,663 B2 * | 4/2004 | Bakran et al. | 60/653 |
| 2002/0073712 A1 | 6/2002 | Kopko | |

* cited by examiner

*Primary Examiner*—Hoang Nguyen
(74) *Attorney, Agent, or Firm*—Oral Caglar, Esq.

(57) ABSTRACT

A closed cycle turbine system is provided for the generation of power in a light, high altitude airborne vehicle. The closed cycle turbine system may operate according to either the Brayton or the Rankine cycles. The working fluid for the closed cycle may be alternately heated by the combination of an external burner and heat exchanger and cooled by expansion and radiation. The use of the external burner operating at near the atmospheric pressure may eliminate the requirement for a compressor to compress large amounts of low density, ambient air for use in the turbine. Additional ambient air may be provided to the burner by either using a fan to concentrate the ambient air or pressurizing the fuel stream so as to entrain the ambient air therein. The external burner may use a gaseous fuel such as hydrogen or liquid fuel such as jet fuel to provide heat for the closed cycle.

27 Claims, 2 Drawing Sheets

METHOD OF POWER GENERATION FOR AIRBORNE VEHICLES

BACKGROUND OF THE INVENTION

The present invention generally relates to methods and devices for power generation in airborne vehicles, and more specifically for airborne vehicles operating at high altitudes and/or low speeds, where the ambient air pressure is low and the work required to compress ambient air for a gas turbine or reciprocating engine is excessive.

Conventional airborne vehicles achieve flight by using a fuel, such as jet fuel, combusted with air in a gas turbine engine to generate sufficient thrust to enable the wings to develop lift in order to keep the vehicle aloft. The gas turbine engine may also be used for generating power for onboard needs, such as, for example, hydraulic power for control surface actuation and electrical power for avionics equipment. Such gas turbine engines used to generate power for thrust, lift, and onboard power requirements typically operate in an open loop Brayton cycle. It has been found that this approach provides an acceptable means for powering an airborne vehicle in terms of fuel consumption, weight, and cost, and this approach is thus a standard method of powering air vehicles.

In a conventional, recuperated gas turbine engine 100 operated in an open-cycle, as illustrated in FIG. 1, the compressor 110, turbine 120, and generator 130 are coaxially mounted on a common central shaft 140, or the generator is driven by the common shaft turbine-compressor via a gearbox. The compressor 110 compresses air for the combustor 160 after it has been heated in the recuperator 180. The heated compressed air is mixed with fuel in the combustor 160 where it is then ignited and burned. The combustion products are then expanded in the turbine 120 which drives the compressor 110 and generator 130. This cycle is opened between the recuperator outlet 150 from the low-pressure side of the recuperator 180 and the compressor inlet 170. Thus ambient air that may have been filtered, cooled, or otherwise treated enters the compressor 110, and the products of combustion are discharged out the recuperator outlet 150 on the low-pressure side of the recuperator 180.

However, a new class of airborne vehicles is currently being studied for surveillance and communications relay applications. Such applications require long flight durations, in terms of days and months instead of hours, at high altitudes. Airborne vehicles of this class are generally slow-moving, lighter-than-air vehicles, which require little or no thrust for lift and minimal thrust for station keeping. Weight must be kept at a minimum in order for these vehicles to stay aloft for these extended periods of time. Because the vehicles are slow-moving, they do not require large engines for thrust and consequently feature much smaller engines with correspondingly low onboard fuel storage capacities. These features also serve to minimize the weight of such airborne vehicles. However, engines having low or no thrust requirement generally are not able to provide electrical power to operate onboard avionics equipment at high efficiency or low specific fuel consumption.

Selection of a system for generating onboard electrical power for lighter-than-air airborne vehicles can be difficult. Conventional open-loop Brayton cycle systems do not offer particularly high thermal efficiency when the available thrust provided by the engine exhaust is discounted. Furthermore, at the low ambient pressures found at altitudes above 50,000 feet, both the power and the efficiency of these conventional open-loop Brayton cycle systems are greatly diminished. Even at high speeds in excess of 550 knots with effective (90%) ram recovery efficiency, a typical gas turbine engine provides at 50,000 feet only 14% of the thrust available at sea level, as discussed of the reference work entitled "Aircraft Turbine Engine Technology" by Irwin Treager, page 101, FIG. 3-16, which is incorporated herein in its entirety by reference. At lower airspeeds, or without ram recovery, there is essentially no output shaft power available from gas turbine engines operating in an open-loop Brayton cycle at altitudes exceeding 50,000 feet.

The problems attendant with high altitude operation of Brayton cycle gas turbine engines have been addressed in the prior art. For example, U.S. Pat. No. 4,759,178 describes an auxiliary power unit comprising a gas expansion motor and a Brayton cycle gas turbine engine which jointly power a common load. The gas expansion motor is used initially to start the gas turbine, which is powered by standard JP-type fuel. This system employs two separate motors and therefore would present a weight penalty to a light, high altitude airborne vehicle.

U.S. Pat. No. 4,067,189 employs another such engine combination, where a closed loop Rankine cycle and an open-loop Brayton cycle are used in conjunction with one another. Again, because two engines are used, there would necessarily be a weight penalty for light, high altitude airborne vehicles.

U.S. Pat. No. 5,012,646 relates to an engine having a means for pre-cooling the air between the compressor and the combustor of the turbine. This system requires a significant expenditure of power to compress ambient air, especially at high altitudes.

U.S. Pat. No. 5,309,029 provides a turbine engine having a clutch enabling the compressor section to be decoupled from the turbine section, so that the engine can be more efficiently operated using stored oxidizer at a higher altitude but coupled so that the compressor can enable the engine to provide greater power at lower altitude. Again, the presence of a clutch and an additional oxidizer source creates a weight penalty for light, high-altitude airborne vehicles.

An Otto cycle piston engine is a more attractive alternative than an open Brayton cycle engine at low power levels and low airspeeds. The overall thermal efficiency of an Otto cycle piston engine is 20-30%. However, the power output of a piston engine is approximately proportional to the engine intake pressure. At high altitudes above 50,000 feet, even a modestly powerful piston engine would be quite large and heavy. The engine size can be reduced with a turbocharger or a supercharger, but these devices adversely affect the overall engine efficiency. Furthermore, the storage weight of the onboard fuel required for long duration flights would exceed the practical weight requirements for a lighter-than-air airborne vehicle.

Another alternative would be the use of nuclear power with a gas turbine engine operating with a closed loop Brayton or Rankine cycle. This combination would provide substantially longer operating duration, but is considered unattractive from an environmental standpoint.

Solar power may also be used for electrical power generation for lighter-than-air airborne vehicles. Such solar systems might involve the use of photovoltaic cells or a solar-heated Brayton or Rankine cycle system, coupled with batteries for power at night. Although an onboard fuel supply is not required by such a system, the solar collector required to provide electrical power even at modest power levels would be quite large, and the batteries would be unacceptably heavy.

As can be seen, there is a need for a lightweight system for generating power for a lighter-than-air airborne vehicle. The generating system should operate without compression of ambient air that normally results in high specific fuel consumption, and without the use of an on-board oxidizer, the weight of either of which would prevent the airborne vehicle from staying aloft for several days or even months.

SUMMARY OF THE INVENTION

A system for supplying electrical power for an airborne vehicle operating at an altitude of at least 50,000 feet is provided, which comprises an engine operating in a closed cycle having a working fluid for alternately receiving heat and releasing heat; a burner for the combustion of a fuel in the presence of ambient air to produce heated combustion by-products; and a heat exchanger transferring the heat contained in the heated combustion by-products to the working fluid, thereby converting the heated combustion by-products into cooled combustion by-products that are vented to the ambient air.

A power generation system for supplying electrical power in a lighter-than-air airborne vehicle operating at an altitude greater than 50,000 feet is also provided, where the system comprises a gas turbine engine operating in a closed Brayton cycle with the closed cycle having a working fluid for alternately receiving heat and releasing heat; a low pressure burner providing combustion of a fuel in the presence of ambient air to produce heated combustion by-products; and a heat exchanger transferring the heat contained in the heated combustion by-products to the working fluid, the components configured so that the heated combustion by-products are converted into cooled combustion by-products that are vented to the ambient air.

A power generation system supplying electrical power in an airborne vehicle operating in-flight for a period of at least two continuous days is also provided, in which the system comprises a gas turbine engine operating in a closed cycle having a working fluid for alternately receiving heat and releasing heat; a low pressure burner providing combustion of a fuel in the presence of ambient air to produce heated combustion by-products; and a heat exchanger transferring the heat contained in the heated combustion by-products to the working fluid, so that the heated combustion by-products are converted into cooled combustion by-products that are vented to the ambient air.

A method is also provided for heating a working fluid in a closed cycle turbine engine, the method comprising the steps of maintaining combustion of a fuel in ambient air at altitudes greater than 50,000 feet to provide heated combustion by-products; transferring heat from the heated combustion by-products to the working fluid so that the heated combustion by-products are converted into cooled combustion by-products; and venting the cooled combustion by-products to the ambient air.

A method for supplying power using a closed Brayton cycle engine at altitudes greater than 50,000 feet is also provided, where the method comprises directing a heated working fluid to a turbine to cause the turbine to rotate a shaft; directing the heated working fluid released by the turbine to a recuperator, so that heat from the heated working fluid is removed to provide a cooled working fluid; directing the cooled working fluid to a radiator so that residual heat contained in the cooled working fluid is vented to the ambient air; directing the cooled working fluid from the radiator to a compressor; directing the cooled working fluid from the compressor to the recuperator to that the cooled working fluid receives the heat removed from the heated working fluid from the turbine to provide heated working fluid to a heat exchanger; and providing a heat source to the heat exchanger, wherein the heated working fluid receives additional heat from the heat source.

A method for supplying power using a closed Rankine cycle engine at altitudes greater than 50,000 feet is also provided, where the method comprises directing a heated working fluid to a turbine to cause the turbine to rotate a shaft; directing the heated working fluid released by the turbine to a recuperator so that heat from the heated working fluid is removed to provide a cooled working fluid; directing the cooled working fluid to a condenser so that residual heat contained in the cooled working fluid is vented to ambient air; directing the cooled working fluid from the condenser to a pump; directing the cooled working fluid from the pump to the recuperator so that the cooled working fluid receives heat removed from the heated working fluid from the turbine to provide heated working fluid to a boiler; and providing a heat source to the boiler, wherein the heated working fluid receives additional heat from the heat source.

Still another method for supplying power is provided, which uses a closed Brayton cycle engine in an airborne vehicle operating in-flight for a period of at least two continuous days, the method comprising the steps of directing a heated working fluid to a turbine to cause the turbine to rotate a shaft; directing the heated working fluid released by the turbine to a recuperator, so that heat from the heated working fluid is removed to provide a cooled working fluid; directing the cooled working fluid to a radiator so that residual heat contained in the cooled working fluid is vented to the ambient air; directing the cooled working fluid from the radiator to a compressor; directing the cooled working fluid from the compressor to the recuperator so that the cooled working fluid receives the heat removed from the heated working fluid from the turbine to provide heated working fluid to a heat exchanger; and providing a heat source to the heat exchanger so that the heated working fluid receives additional heat from the heat source.

Still another method for supplying power is provided, which uses a closed Rankine cycle engine in an airborne vehicle operating in-flight for a period of at least two continuous days, the method comprising the steps of directing a heated working fluid to a turbine to cause the turbine to rotate a shaft; directing the heated working fluid released by the turbine to a recuperator so that heat from the heated working fluid is removed to provide a cooled working fluid; directing the cooled working fluid to a condenser so that residual heat contained in the cooled working fluid is vented to ambient air; directing the cooled working fluid from the condenser to a pump; directing the cooled working fluid from the pump to the recuperator so that the cooled working fluid receives heat removed from the heated working fluid from the turbine to provide heated working fluid to a boiler; and providing a heat source to the boiler so that the heated working fluid receives additional heat from the heat source.

These and other features, aspects, and advantages of the present invention will become better understood with reference to the following drawings, description, and claims.

DETAILED DESCRIPTION OF THE INVENTION

Figure 1:
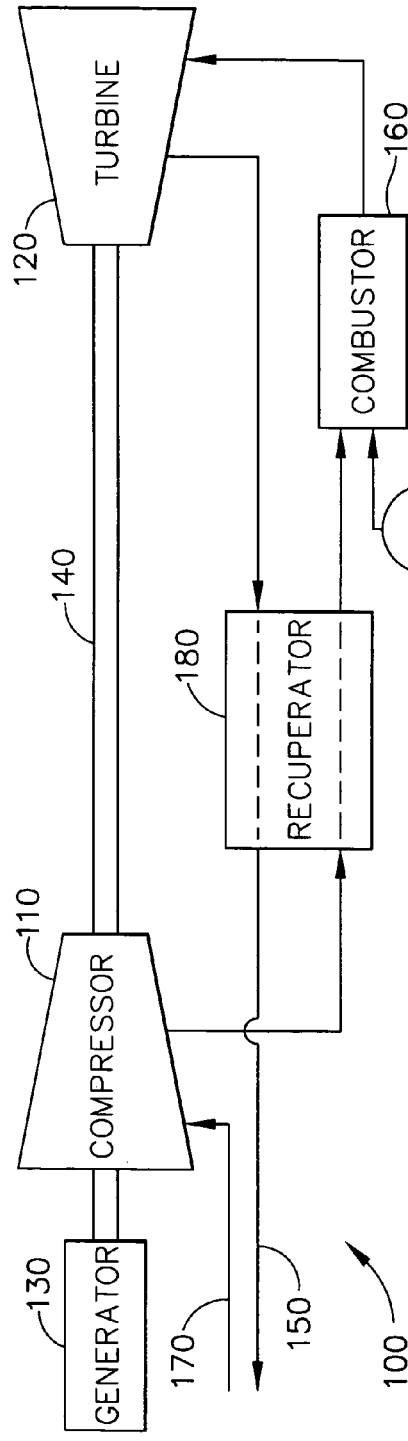
FIG. 1 shows a schematic diagram of a prior art recuperated gas turbine engine operating under an open loop Brayton cycle.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the current invention includes systems, devices, and methods for improving gas turbine power generation systems in airborne vehicles operating at high altitudes, where more work is required to compress the ambient air than at lower altitudes. Although burners and heat exchangers with closed loop systems have been used in large, ground-based turbine systems in the past, they have not been applied to airborne platforms where weight is a major factor. More specifically, the current invention uses a low pressure, atmospheric burner and heat exchanger to heat a working fluid of a closed loop Rankine or Brayton power cycle for a power turbine, to provide both thrust for the airborne vehicle and electrical power for on-board power requirements. The use of the atmospheric burner may eliminate the need to compress the ambient air and thus may improve overall system efficiency. Additional means may be used to induce the ambient air to flow through or across the burner and heat exchanger. The estimated overall thermal efficiency of the system is about 40%.

By using the closed-loop Brayton or Rankine cycle along with an atmospheric burner, the present invention avoids the high-altitude restrictions of open-loop Brayton cycle systems. It offers a higher operating efficiency than Otto cycle piston engines, without the environmental issues associated with nuclear power or the surface area or energy storage requirements of solar power systems.

Prior art power turbine systems that are used with airborne platforms generally operate using an open cycle in ambient air and require a compressor to compress large amounts of ambient air for combustion in the turbine. At altitudes in excess of 50,000 feet where the ambient air is less dense, the use of such a compressor results in a less efficient turbine engine, since a higher percentage of the turbine's power output is required to operate the compressor so that sufficient quantities of ambient air may be compressed for the turbine. While closed cycle engines have been used for ground based power generation systems, they have not been extensively heretofore used in airborne platforms because of weight restrictions. The present invention uses a closed cycle in which the compressor operates on an internal working fluid and not ambient air. The working fluid may be heated by an atmospheric burner that is designed to operate efficiently in the lower air pressures found at altitudes over 50,000 feet. The atmospheric burner may be optimized for use with fuels that burn efficiently at lower air pressures. Additional means may be used to improve combustion of the fuel, such as injecting the fuel at a high velocity so as to entrain ambient air therein or adding a fan or blower to increase flow of ambient air through the burner and heat exchanger. In a closed loop gas turbine engine configured according to the present invention, a working fluid may be continuously recirculated within the components of the gas turbine engine, so that the working fluid continuously absorbs and releases heat and thus performs work. The working fluid may be heated from the external heat source, i.e. the atmospheric burner. The heated working fluid in the closed-loop cycle may be used to drive the turbine engine to generate power. A system configured in this manner may allow the airborne vehicle to remain aloft for extended periods of time, for example, from two or more days to months.

Figure 2:
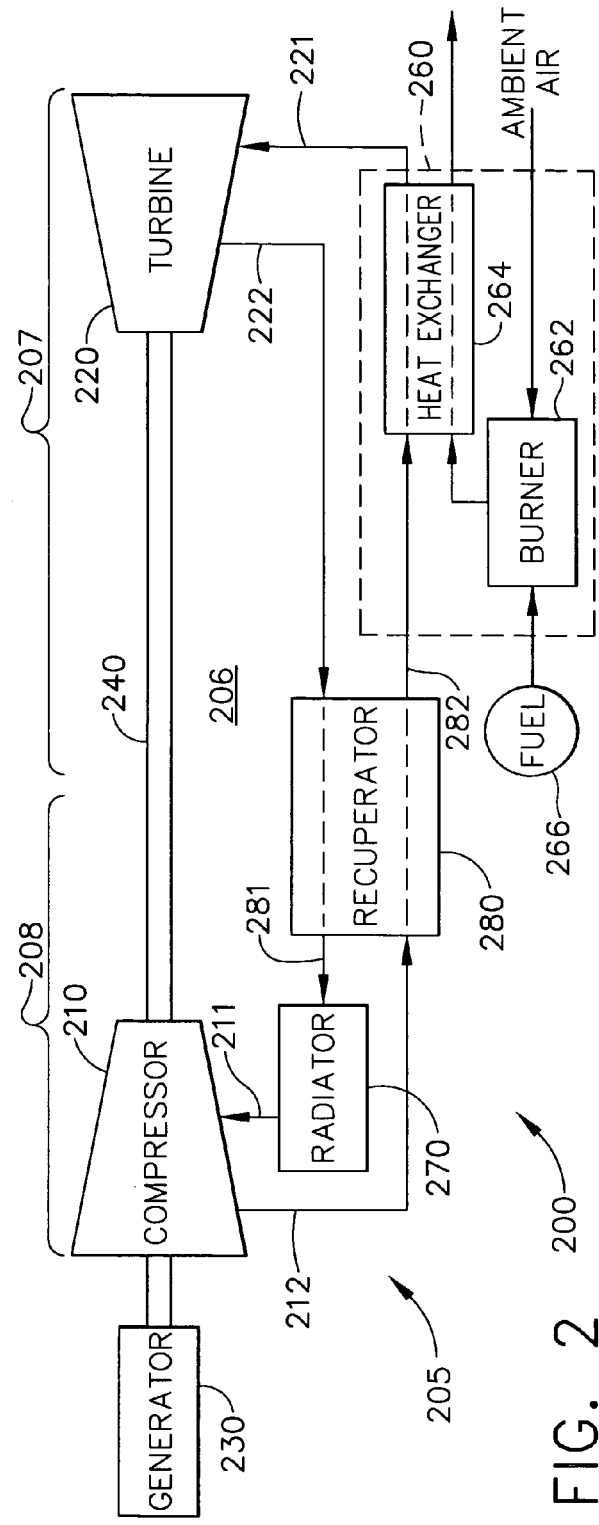
FIG. 2 shows a schematic diagram of a closed loop Brayton cycle gas turbine engine, according to an embodiment of the invention.

Referring now to FIG. 2, a closed loop, gas turbine engine 200 is shown configured in a closed-loop Brayton cycle, according to one embodiment of the invention. A closed loop 205 may be a path or conduit in which a working fluid 206 may be recirculated, alternately losing heat to become a cool working fluid 208 and gaining heat to become a hot working fluid 207, without increasing or decreasing the mass of the working fluid 206. This closed loop 205 may be the path taken by the working fluid 206 as it flows from a turbine outlet 222 and thence through recuperator 280 in a first direction; conduit 281, radiator 270, compressor inlet 211, compressor 210, compressor outlet 212, recuperator 280 in a second direction; and conduit 282, heat exchanger 264, and turbine inlet 221. As such, the working fluid 206 may be circulated within the closed loop among the turbine 220, the recuperator 280, and the compressor 210.

A heat source component 260 further described below may be provided between the recuperator 280 and the turbine inlet 221 to heat the working fluid 206 to provide hot working fluid 207 at a temperature high enough to drive the turbine 220 by expansion. Hot working fluid 207 may be provided to the turbine inlet 221, where it drives the turbine 220 in a standard Brayton cycle to rotate a shaft 240 and thereby actuate the compressor 210 and a generator 230.

From the turbine outlet 222, the hot working fluid 207 may flow to the recuperator 280, which transfers heat from the hot working fluid 207 to the working fluid 206 flowing in the opposing direction from the compressor 210, thus transforming the hot working fluid 207 into a cool working fluid 208; heat transfer may generally be accomplished by means of conduction and radiation.

The cool working fluid 208 from the recuperator 280 may be directed through conduit 281 to a radiator 270, which may further cool the cool working fluid 208 by radiant action to the ambient air. The cool working fluid 208 may then be directed through the compressor 210 to compress the cool working fluid 208, thus providing pressure to maintain flow of the cool working fluid 208 back through the recuperator 280 (where it gains heat to become hot working fluid 207 again) and heat source component 260, where it is again heated for reintroduction back into the turbine inlet 221.

The working fluid 206 may be composed of any suitable heat transfer liquid having high caloric capacity. One possible working fluid, by way of example, may be xeon, but other such working fluids may be used without departing from the scope of the invention.

The heat source component 260 may comprise a heat exchanger 264 and a burner 262. The burner 262 may be of a high efficiency design to burn a fuel provided by a fuel source 266 at low air pressures typically found at altitudes over 50,000 feet. Since there is little air available to enhance fuel atomization at these altitudes, it is likely that a highly volatile liquid or a gaseous fuel, such as hydrogen, would be desirable. A fan (not shown) may be used to assist the burner 262 in combustion by promoting and assisting the convective movement of the ambient air through the mechanism of the burner 262. Also, the fuel may be injected under a pressure that is higher than ambient air pressure so as to entrain ambient air within the injected fuel stream and thus improve combustion characteristics.

A low pressure burner 262 of any suitable design may be used in this application without departing from the scope of the invention. One such design may feature a standard burner with a plurality of fuel ports, such as one might find in a conventional home heating furnace. Air flow through the low pressure burner 262 may be induced between the fuel ports either by free convection, with a fan or blower, or by the force provided by fuel injection. Combinations of these methods may also be used without departing from the scope of the invention. A catalytic burner may also be used for the low pressure burner 262. Use of a catalytic burner may entail the use of a fan to blow air through a granular catalyst bed of the burner or across a catalyst-coated monolithic structure. The fuel may be injected upstream of the catalyst and fully mixed with the air prior to contacting the catalyst; the low ambient pressure would inhibit upstream flame propagation.

The heat exchanger 264 may be located in close proximity to the burner so that it may be in direct contact with the combustion gases provided by the burner. The high-temperature heat transfer may thus be achieved by either free or forced convection. The low ambient pressure may require a relatively large high-temperature heat transfer surface area. Auxiliary fins may be provided along the high temperature heat transfer surface to enhance heat transfer.

The heat exchanger 264 may be used to receive the heated combustion by-products from the burner 262 and the heated working fluid from the recuperator 280 and to transfer the heat contained in the heated combustion by-products to the heated working fluid, thereby cooling the heated combustion by-products. The combustion by-products thus cooled by the heat exchanger 264 may then be vented to the ambient air.

In the embodiment of the invention shown in FIG. 2, a second heat exchanger may optionally be installed in conduit 281, conduit 211, or conduit 212 to recover waste heat from other devices that may be on the airborne vehicle, such as, for example, the exhaust from a separate engine or ventilation air exhausted from avionics equipment, to further improve fuel efficiency. This waste heat may be transferred from a conduit containing the hot exhaust or ventilation air to the conduit containing the cool working fluid 208 by the second heat exchanger using conduction and radiation, where both conduits separately enter and exit the second heat exchanger in opposite flow directions.

Figure 3:
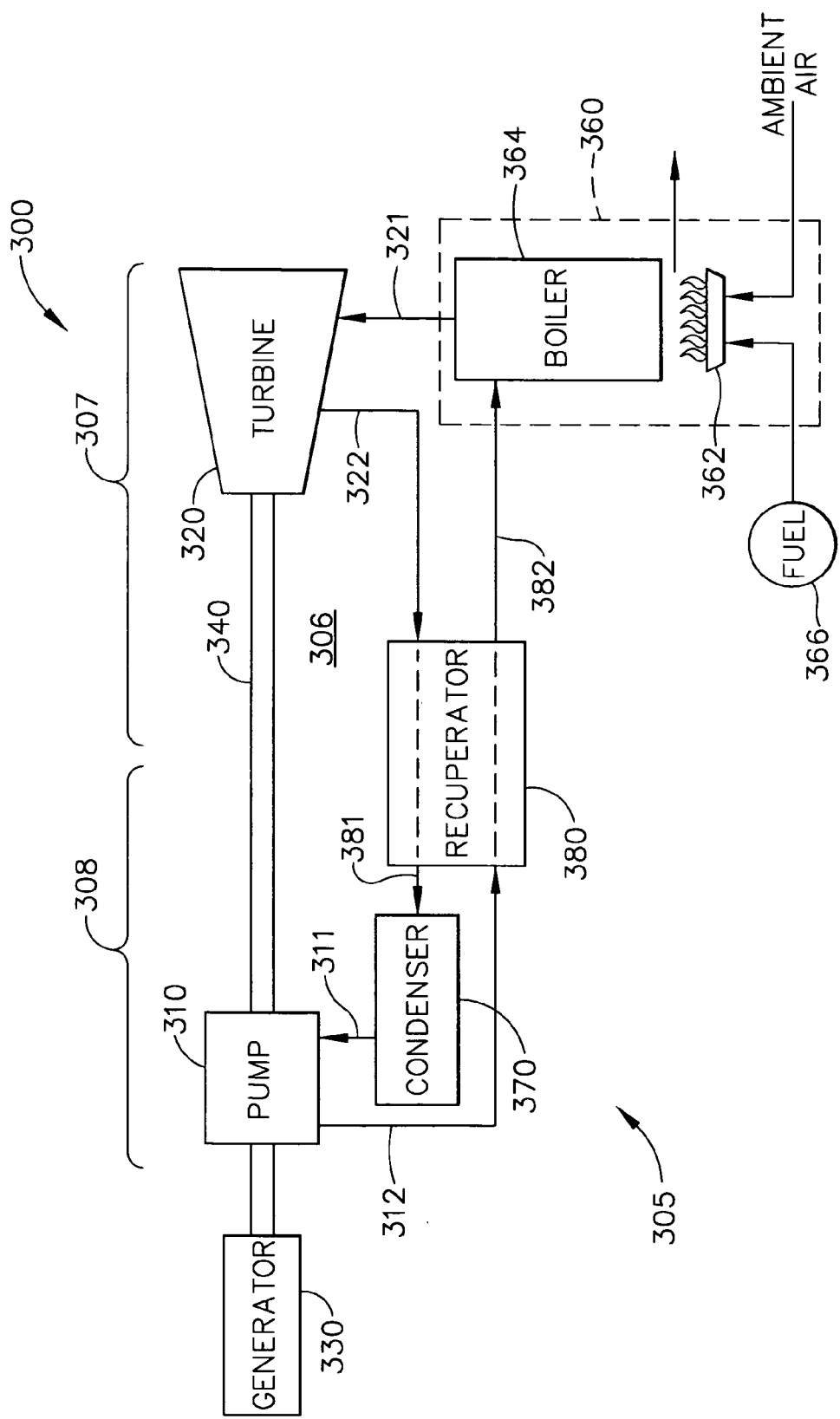
FIG. 3 shows a schematic diagram of a closed loop Rankine cycle turbine engine, according to an embodiment of the invention.

Another embodiment of the invention is shown in FIG. 3, which depicts a Rankine cycle configuration. According to FIG. 3, an engine 300 may include a turbine 320, a pump 310, and a generator 330, each coaxially mounted on a common shaft 340. A working fluid 306 may be an incompressible liquid, such as water, which, as it changes phase, may alternately be characterized as steam 307 or cooled water 308. A heat exchange component 360 may include a boiler 364 in which steam 307 may be generated for introduction into the turbine 320, causing it to rotate shaft 340. Pump 310 and generator 330 may also be powered by shaft 340. The steam 307 coming from the turbine 320 may be passed through a recuperator 380 where its caloric content may be reduced, and thence through a condenser 370 where the steam 307 is condensed back into cooled water 308. The cooled water 308 may be pumped by pump 310 back through the recuperator 380, where it may again be heated, and to the boiler 364 where the cycle may be repeated.

In another embodiment of the invention shown in FIG. 3, a second heat exchanger may be put within conduit 381, conduit 311, or conduit 312 to recover waste heat from other devices that may be on the airborne vehicle, such as, for example, the exhaust from a separate engine or ventilation air exhausted from avionics equipment, to further improve fuel efficiency. This waste heat may be transferred from a conduit containing the hot exhaust or ventilation air to the conduit containing the cool working fluid 308 by the second heat exchanger using conduction and radiation, where both conduits separately enter and exit the second heat exchanger in opposite flow directions.

As can be seen, the invention provides a lightweight power generation system and method for efficient power generation on a lighter-than-air airborne vehicle operating at altitudes in excess of 50,000 feet for periods of time that may be measured in days or weeks. The innovative system may burn a fuel without requiring a significant power expenditure required for compressing the low density ambient air by employing a low-pressure burner.

It should be understood, of course, that the foregoing relates to exemplary embodiments of the invention and that modifications may be made without departing from the spirit and scope of the invention as set forth in the following claims.

We claim:

1. A system for providing electrical power for an airborne vehicle operating at an altitude of at least 50,000 feet, the system comprising:
   an engine operating with a working fluid in a closed cycle, the working fluid being recirculated within the closed cycle for alternately receiving heat and releasing heat, wherein the closed cycle has no communication with ambient air;
   a burner burning a fuel in the presence of ambient air present at an altitude of at least 50,000 feet to produce heated combustion by-products, the ambient air being unheated and uncompressed by the system; and
   a heat exchanger transferring the heat contained in the heated combustion by-products to the working fluid, thereby converting the heated combustion by-products into cooled combustion by-products that are vented to the ambient air.

2. The system described in claim 1, wherein the airborne vehicle is a lighter-than-air airborne vehicle.

3. The system described in claim 1, wherein the burner is a catalytic burner.

4. The system described in claim 1, wherein the fuel is hydrogen gas.

5. The system described in claim 1, wherein the closed cycle is a Brayton cycle.

6. The system described in claim 1, wherein the closed cycle is a Rankine cycle, the heat exchanger is a boiler, and the working fluid is water that changes phases during the cycle.

7. The system described in claim 1, wherein the fuel is provided in a fuel stream having a pressure higher than that of the ambient air, wherein ambient air is entrained into the fuel stream.

8. The system described in claim 1, wherein the ambient air is provided by means of a fan.

9. A power generation system supplying electrical power in a lighter-than-air airborne vehicle operating at an altitude greater than 50,000 feet, the system comprising:
   a turbine engine operating in a closed Brayton cycle, the closed cycle with a working fluid for alternately receiving heat and releasing heat, wherein the working fluid within the closed Brayton cycle does not communicate with ambient air and has constant mass;

a burner providing combustion of a fuel in the presence of ambient air found at altitudes greater than 50,000 feet at ambient pressure to produce heated combustion by-products, the ambient air being uncompressed and unheated by the system, wherein a fuel pressure is higher than the ambient air pressure;

a heat exchanger transferring the heat contained in the heated combustion by-products to the working fluid, thereby converting the heated combustion by-products into cooled combustion by-products that are vented to the ambient air.

10. The system described in claim 9, wherein the fuel is hydrogen.

11. A power generation system for supplying electrical power in an airborne vehicle operating in-flight for a period of at least two continuous days, the system comprising a turbine engine adapted to operate in a closed cycle at an altitude of at least 50,000 feet with a working fluid for alternately receiving heat and releasing heat, wherein the working fluid within the closed cycle does not communicate with ambient air and has constant mass;

a burner for providing combustion of a fuel in the presence of ambient air at said altitude, the ambient air being unheated and uncompressed by the system, the burner producing heated combustion by-products, wherein the fuel is injected into the burner at a pressure that is higher than ambient air pressure so as to entrain ambient air in the fuel and thereby improve combustion of the fuel at said altitude; and a heat exchanger for transferring the heat contained in the heated combustion by-products to the working fluid, thereby converting the heated combustion by-products into cooled combustion by-products that are vented to the ambient air.

12. The system described in claim 11, wherein the closed cycle is a closed Brayton cycle.

13. The system described in claim 11, wherein the airborne vehicle is a lighter-than-air airborne vehicle.

14. The system described in claim 11, wherein the fuel is hydrogen.

15. A method for heating a working fluid in a closed cycle turbine engine, the closed cycle having no communication with ambient air and containing a working fluid, the working fluid having constant mass, the method comprising the steps of burning a fuel in the presence of unheated ambient air that has not been compressed in a catalytic burner at altitudes greater than 50,000 feet to provide heated combustion by-products;

transferring heat from the heated combustion by-products to the working fluid, thereby converting the heated combustion by-products into cooled combustion by-products; and venting the cooled combustion by-products to the ambient air.

16. The method described in claim 15, wherein transferring heat from the heated combustion by-products to the working fluid is accomplished by a heat exchanger.

17. The method described in claim 15, wherein the closed cycle turbine engine operates according to a Brayton cycle.

18. The method described in claim 15, wherein the closed cycle turbine engine operates according to a Rankine cycle.

19. A method for providing power using a closed Brayton cycle engine at altitudes greater than 50,000 feet, the method comprising directing a heated working fluid to a turbine to cause the turbine to rotate a shaft;

directing the heated working fluid released by the turbine to a recuperator, wherein heat from the heated working fluid is removed to provide a cooled working fluid;

directing the cooled working fluid to a radiator, whereby residual heat contained in the cooled working fluid is vented to the ambient air;

directing the cooled working fluid from the radiator to a compressor;

directing the cooled working fluid from the compressor to the recuperator, wherein the cooled working fluid receives the heat removed from the heated working fluid from the turbine to provide heated working fluid to a heat exchanger; and providing a heat source to the heat exchanger, wherein the heated working fluid receives additional heat from the heat source and wherein the heat source is the combustion by-products of a burner burning a fuel in the presence of ambient air found at altitudes greater than 50,000 feet, the ambient air being unheated and uncompressed.

20. A method described in claim 19, wherein the fuel is hydrogen.

21. A method for providing power using a closed Rankine cycle engine at altitudes greater than 50,000 feet, the closed Rankine cycle operating with a working fluid that has constant mass and no communication with ambient air, the method comprising the steps of:

heating the working fluid in a boiler to provide a heated working fluid;

directing the heated working fluid to a turbine to cause the turbine to rotate a shaft;

directing the heated working fluid released by the turbine to a recuperator, wherein heat from the heated working fluid is removed to provide a cooled working fluid;

directing the cooled working fluid to a condenser, whereby residual heat contained in the cooled working fluid is vented to ambient air;

directing the cooled working fluid from the condenser to a pump;

directing the cooled working fluid from the pump to the recuperator, wherein the cooled working fluid receives heat removed from the heated working fluid from the turbine to provide heated working fluid to the boiler; and providing the heated working fluid in the boiler with additional heat from combustion by-products of a burner to the boiler, the burner burning a fuel in the presence of ambient air found at altitudes greater than 50,000 feet, the ambient air being uncompressed and unheated.

22. The method described in claim 21, wherein the fuel is hydrogen.

23. A method for providing power using a closed Brayton cycle engine in an airborne vehicle operating in-flight for a period of at least two continuous days at altitudes greater than 50,000 feet, the method comprising directing a heated working fluid to a turbine to cause the turbine to rotate a shaft;

directing the heated working fluid released by the turbine to a recuperator, wherein heat from the heated working fluid is removed to provide a cooled working fluid;

directing the cooled working fluid to a radiator, whereby residual heat contained in the cooled working fluid is vented to the ambient air;

directing the cooled working fluid from the radiator to a compressor;

directing the cooled working fluid from the compressor to the recuperator, wherein the cooled working fluid receives the heat removed from the heated working fluid from the turbine to provide heated working fluid to a heat exchanger;

providing heat to the heat exchanger by burning a fuel in the presence of ambient air that is uncompressed and unheated.

24. The method described in claim 23, wherein the fuel is hydrogen.

25. The method described in claim 23, wherein the airborne vehicle is a lighter-than-air airborne vehicle.

26. A method for providing power using a closed Rankine cycle engine in an airborne vehicle operating in-flight for a period of at least two continuous days at altitudes greater than 50,000 feet, the closed Rankine cycle engine operating with a working fluid having constant mass and no communication with ambient air, the method comprising heating the working fluid in a boiler to provide a heated working fluid;

directing the heated working fluid to a turbine to cause the turbine to rotate a shaft;

directing the heated working fluid released by the turbine to a recuperator, wherein heat from the heated working fluid is removed to provide a cooled working fluid;

directing the cooled working fluid to a condenser, whereby residual heat contained in the cooled working fluid is vented to ambient air;

directing the cooled working fluid from the condenser to a pump; and directing the cooled working fluid from the pump to the recuperator, wherein the cooled working fluid receives heat removed from the heated working fluid from the turbine to provide the heated working fluid to a boiler, the boiler adding heat provided by a burner to the working fluid, the burner burning a fuel in the presence of ambient air that is uncompressed and unheated, the ambient air being present at altitudes greater than 50,000 feet.

27. The method described in claim 26, wherein the fuel is hydrogen.

* * * * *